United States Patent
Powis et al.

(10) Patent No.: US 10,645,138 B2
(45) Date of Patent: May 5, 2020

(54) EVENT STREAM PROCESSING SYSTEM USING A COORDINATING SPOUT INSTANCE

(71) Applicant: salesforce.com, inc., San Francisco, CA (US)

(72) Inventors: Stephen Powis, San Francisco, CA (US); Stanley C. Lemon, San Francisco, CA (US); Kevin Peek, San Francisco, CA (US)

(73) Assignee: SALESFORCE.COM, INC, San Francisco, CA (US)

( * ) Notice: Subject to any disclaimer, the term of this patent is extended or adjusted under 35 U.S.C. 154(b) by 97 days.

(21) Appl. No.: 15/838,089

(22) Filed: Dec. 11, 2017

(65) Prior Publication Data

US 2018/0324239 A1 Nov. 8, 2018

Related U.S. Application Data

(60) Provisional application No. 62/500,258, filed on May 2, 2017, provisional application No. 62/554,860, filed on Sep. 6, 2017.

(51) Int. Cl.
*G06F 13/00* (2006.01)
*H04L 29/06* (2006.01)
(Continued)

(52) U.S. Cl.
CPC .......... *H04L 65/607* (2013.01); *G06F 9/4843* (2013.01); *G06F 9/544* (2013.01);
(Continued)

(58) Field of Classification Search
CPC ...... G06F 9/466; G06F 9/3851; G06F 9/4843; G06F 9/4881; G06F 9/5038; G06F 13/00;
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Extended European Search Report dated Nov. 26, 2018, received in EP Application No. 18168871.4; 13 pages.
(Continued)

*Primary Examiner* — Robert B Harrell
(74) *Attorney, Agent, or Firm* — Schwabe Willimason & Wyatt

(57) ABSTRACT

In one embodiment, a stream processing system ingests data from one or more data sources and converts the data into an unbounded stream for an event stream processor. The stream processing system may include a first coordinating spout instance that is deployed at a first time, the first coordinating spout instance to instantiate one or more second spout instances and deploy said one more second spout instances at a second time that is later than the first time; the one or more second spout instances to: connect to the one or more data sources, respectively, and ingest a respective portion of the data from its respective one of the one or more data sources; and output messages based on the ingested portions of the data; wherein the unbounded stream for the event stream processor is based on the messages. Other embodiments may be disclosed and/or claimed.

25 Claims, 13 Drawing Sheets

(51) Int. Cl.
  *H04L 29/08* (2006.01)
  *G06F 16/2455* (2019.01)
  *G06F 9/54* (2006.01)
  *G06F 9/48* (2006.01)
  *G06F 16/958* (2019.01)

(52) U.S. Cl.
  CPC ........ *G06F 16/24568* (2019.01); *H04L 65/60* (2013.01); *H04L 67/16* (2013.01); *H04L 67/26* (2013.01); *G06F 16/958* (2019.01); *H04L 67/10* (2013.01); *H04L 67/141* (2013.01)

(58) Field of Classification Search
  CPC .......... G06F 9/50; G06F 9/544; G06F 9/5072; G06F 9/5088; G06F 16/958; G06F 16/24568; G06F 17/30; H04L 29/06; H04L 29/0809; H04L 29/06068; H04L 29/08072; H04L 29/08756; H04L 65/60; H04L 65/607; H04L 67/10; H04L 67/16; H04L 67/26; H04L 67/141
  USPC .......................................... 709/246; 718/101
  See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |

(56) References Cited

U.S. PATENT DOCUMENTS

| | | |
|---|---|---|
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2015/0032738 A1* | 1/2015 | Nachnani .............. G06F 16/285 707/723 |
| 2017/0083378 A1* | 3/2017 | Bishop .............. G06F 16/24568 |
| 2017/0132068 A1* | 5/2017 | Parra .................. G06F 11/3409 |

OTHER PUBLICATIONS

"Storm Sidelining Kafka Spout", Apr. 19, 2017; 9 pages; Retrieved from the Internet: URL:https://github.com/salesforce/storm-dynamic-spout/tree/ 12a8d0f6346d53b6f949d580ba5dde9e3b8ab883 [retrieved on Oct. 26, 2018].

"Time Travel Mementos for https://github.com/salesforce/storm-dynamic-spout", Oct. 26, 2018; 2 pages, Retrieved from the Internet: URL:http://timetravel. mementoweb.org/list/20170502000001.

Ce-Kuen Shieh, et al.; "A topology-based scaling mechanism for Apache Storm", International Journal of Network Management, vol. 27, No. 3, Jan. 13, 2016), 12 pages.

Lukasz Kyc; "Retrying consumer architecture in the Apache Kafka", Mar. 24, 2017; 9 pages; Retrieved from the Internet: URL:https://blog.pragmatists.com/retrying-consumerarchitecture-in-the-apache-kafka-939ac4cb851a.

* cited by examiner (Background)

(Background)

EVENT STREAM PROCESSING SYSTEM USING A COORDINATING SPOUT INSTANCE

PRIORITY

This application claims the benefit of U.S. Provisional Application No. 62/500,258, filed May 2, 2017, and U.S. Provisional Application No. 62/554,860, filed Sep. 6, 2017, each of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to computing systems, and some embodiments relate to an event stream processing system, which may utilize virtual spouts, and in some embodiments the virtual spouts may utilize sidelining.

DESCRIPTION OF THE RELATED ART

An application system (such as Salesforce Pardot) may use an event stream processing system (e.g., Apache Storm) heavily to consume from an ordered time series event log (e.g., Apache Kafka). Within an event stream processing system, a spout may ingest data from a source and convert the data into an unbounded stream that the event stream processor can process.

In some systems, a spout may be created once at the point in time that the event stream processing system is deployed. Such spouts may remain static and unchanged until the data stream processing system is redeployed.

In those system deployed with a single spout, the single spout may consume data from a source, such as a single tenant in a multi-tenant system. The spout may handle emitting messages to the event stream processor, as well as handling completed and failed message notifications from the event stream processor. The spout may be fixed and only able to communicate with a data store for the tenant.

Some event stream processing system may include multiple spouts. In such a system, there may be separate spouts for each tenant of more than one tenant. Such spouts may be defined at topology deploy time, and may not be added or removed at any point after that. As new tenants are signed up it may not be possible to create additional new spout components to service the tenant's data sources until the topology is stopped and re-deployed with the new spouts defined. Re-deployment is undesirable for a number of reasons, such as the potential for service disruption for the tenants.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
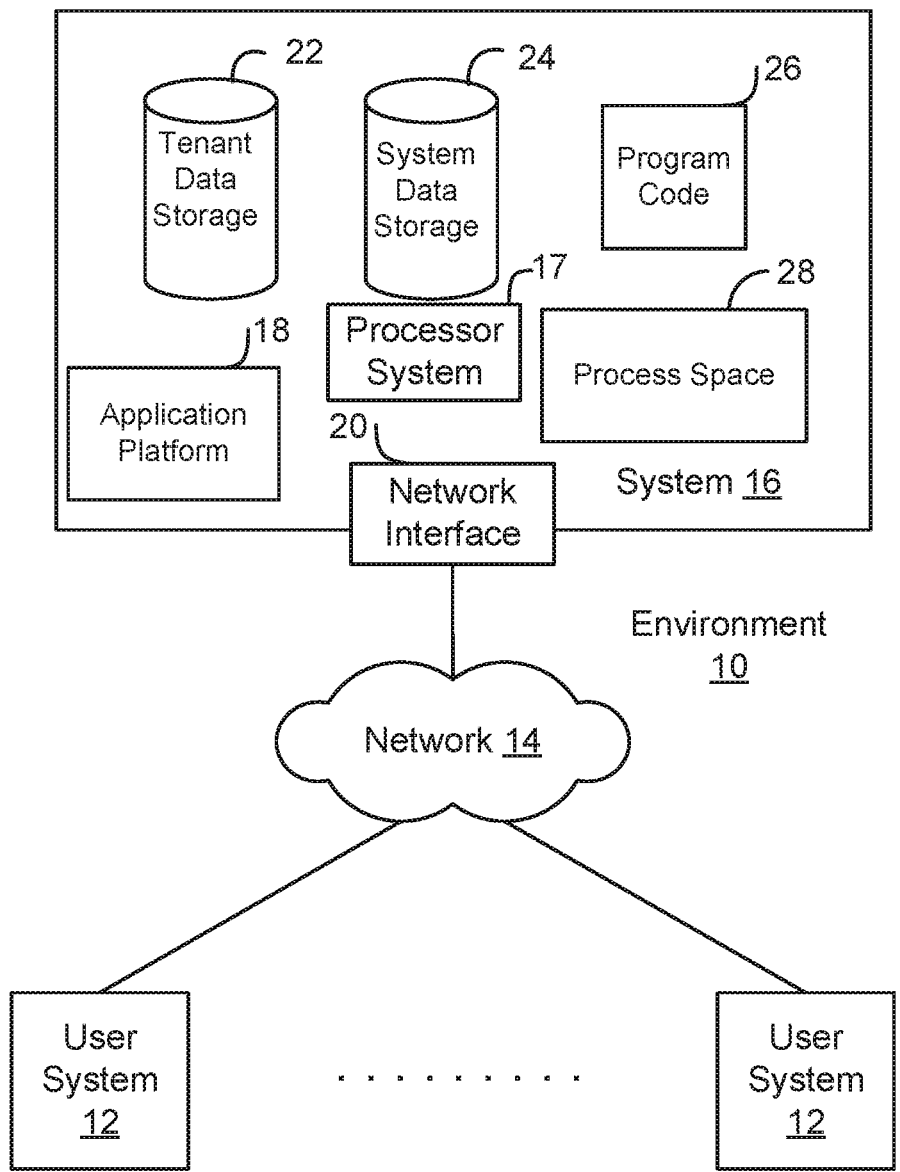
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some spouts in some event stream processing system may be subject to the following lifecycle stages:

Instantiation—This happens before the event processing system is running. The spout may be defined, created, and configured. All components within the system may be defined at this stage of the lifecycle. After this stage is complete, additional components may not be created or removed from the system.

Deployment—The spout component, along with all other components may be deployed to the Apache Storm cluster.

Open—All of the components in the event processing system, including the spout, may be given information about the system that has been deployed, and may be instructed to do any necessary run-time configuration.

Activation—Spout components in the event processing system may be told to "Start." Each Spout may connect to its external data source and may start ingesting data into the event processing system. Messages generated by the spout component may have the following lifecycle stages:

Next message—Event processing system may request the next message to be ingested into the system for processing from a Spout.

Acknowledgement—Event processing system may notify Spout component that a specific message it sent to the system for processing has been successfully processed.

Fail—Event processing system may notify Spout component that a specific message it sent to the system for processing has failed to be processed successfully.

Deactivation—Typically prior to shutdown of the event processing system, all spouts may be instructed to stop ingesting data into the event processing system.

Close—All Spout components may perform any necessary "clean up" or "shutdown" tasks and then stop executing.

Some implementations described and referenced herein are directed to systems, apparatus, computer-implemented methods and computer-readable storage media for an event stream processing system including a virtual spout.

An embodiment utilizing virtual spouts may run one or more "spouts" within a single fixed "coordinating" spout component. The coordinating spout instance may present itself to the stream processing engine as a single fixed spout component at deployment time. The coordinating spout may, in some embodiments, dynamically create new virtual spout instances internally as they are required. Additionally, in some embodiments, the coordinating spout may shut down virtual spout instances as they are no longer required. The coordinating spout instance may manage the Spout lifecycle for all internal virtual spout instances. The coordinating spout instance may also manage all communication between the stream processing engine and its internally managed virtual spout instances in regard to the message lifecycle.

Pardot customers may typically have a Salesforce.com account tied to it. As Pardot signs on new customers daily, there may be a need to stream data from their Salesforce.com account into their Pardot account. Creating a new spout instance and re-deploying a storm topology every time Pardot signs up a new customer may not feasible (due to frequency of new customer sign ups). In an embodiment utilizing virtual spouts, a coordinating spout may monitor for new customers and may create/start a new virtual spout instance. Likewise when a customer terminates their account with Pardot, the coordinating spout may detect this and shut down the customer's corresponding virtual spout instance.

Some embodiments may include a stream processing system to ingest data from one or more data sources and convert the data into an unbounded stream for an event stream processor. The stream processing system may include a first coordinating spout instance that is deployed at a first time, the first coordinating spout instance to instantiate one or more second spout instances and deploy said one or more second spout instances at a second time that is later than the first time.

Each of the one or more second spout instances may be configured to connect to the one or more data sources, respectively, and ingest a respective portion of the data from its respective one of the one or more data sources. The one or more second spout instances may output messages based on the ingested portions of the data. The unbounded stream for the event stream processor may be based on the messages.

In such an embodiment, dynamic changes associated with the data sources may be supported. For example, if a new data source is needed (which may be because of a new tenant in some embodiments or for any other reason) or an existing data source is no longer needed, a new virtual spout can be created or an existing spout can be completed without disrupting processing for the other data sources (e.g., without disrupting services to tenants not associated with the new data source or closed data source).

In some embodiments, the event stream processing system may use the one or more second spout instances to perform sidelining, although this is not required. In these embodiments, each of the first and second spout instances may ingest a same portion of source data, at different times.

One example utilizing sidelining is a stream processing system to ingest data from one or more data sources and convert the data into an unbounded stream for an event stream processor. The stream processing system may include a first coordinating spout instance that is deployed at a first time, the first coordinating spout instance to instantiate a second spout instance and a third spout instance; the first coordinating spout instance to sequentially deploy the second and third spout instances, the second spout instance deployed at a second time that is later than the first time and the third spout instance deployed at a third time that is later than the second time; the second and third spout instances to each ingest a same portion of the data from the one or more data sources and output first messages and second messages, respectively; wherein the unbounded stream for the event stream processor is based on the first and second messages. The second spout instance may be configured to apply a first filtering criterion to the portion of the data from the one or more data sources, and wherein the third spout instance is configured to apply a second filtering criterion that is different than the first filtering criterion to the portion of the data from the one or more data sources. The second filtering criterion may comprise a negation of the first filtering criterion.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
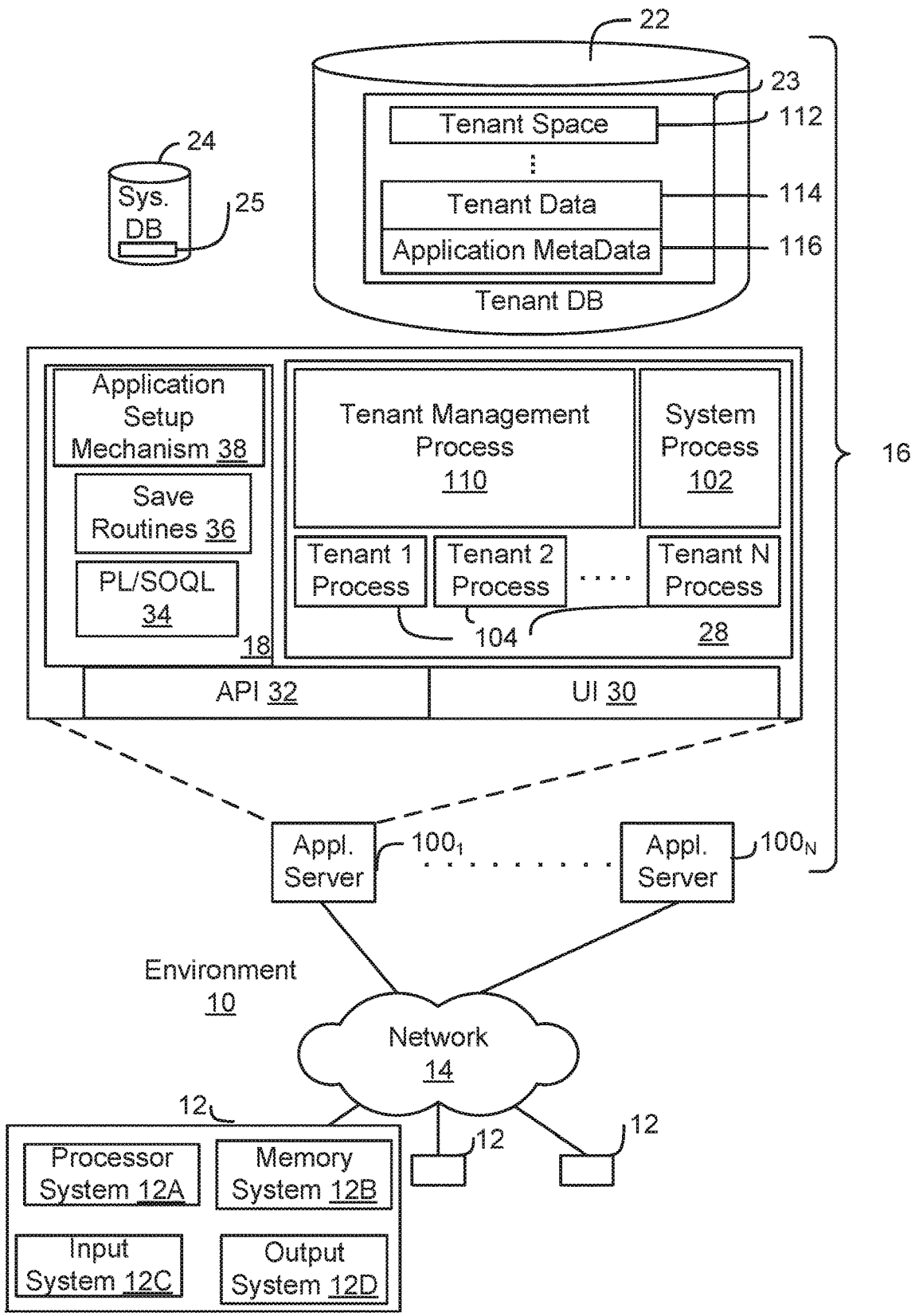
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers 100₁-100N. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 1001 can be coupled via the network 14 (for example, the Internet), another application server 100N-1 can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Event Stream Processing System

Figure 2:
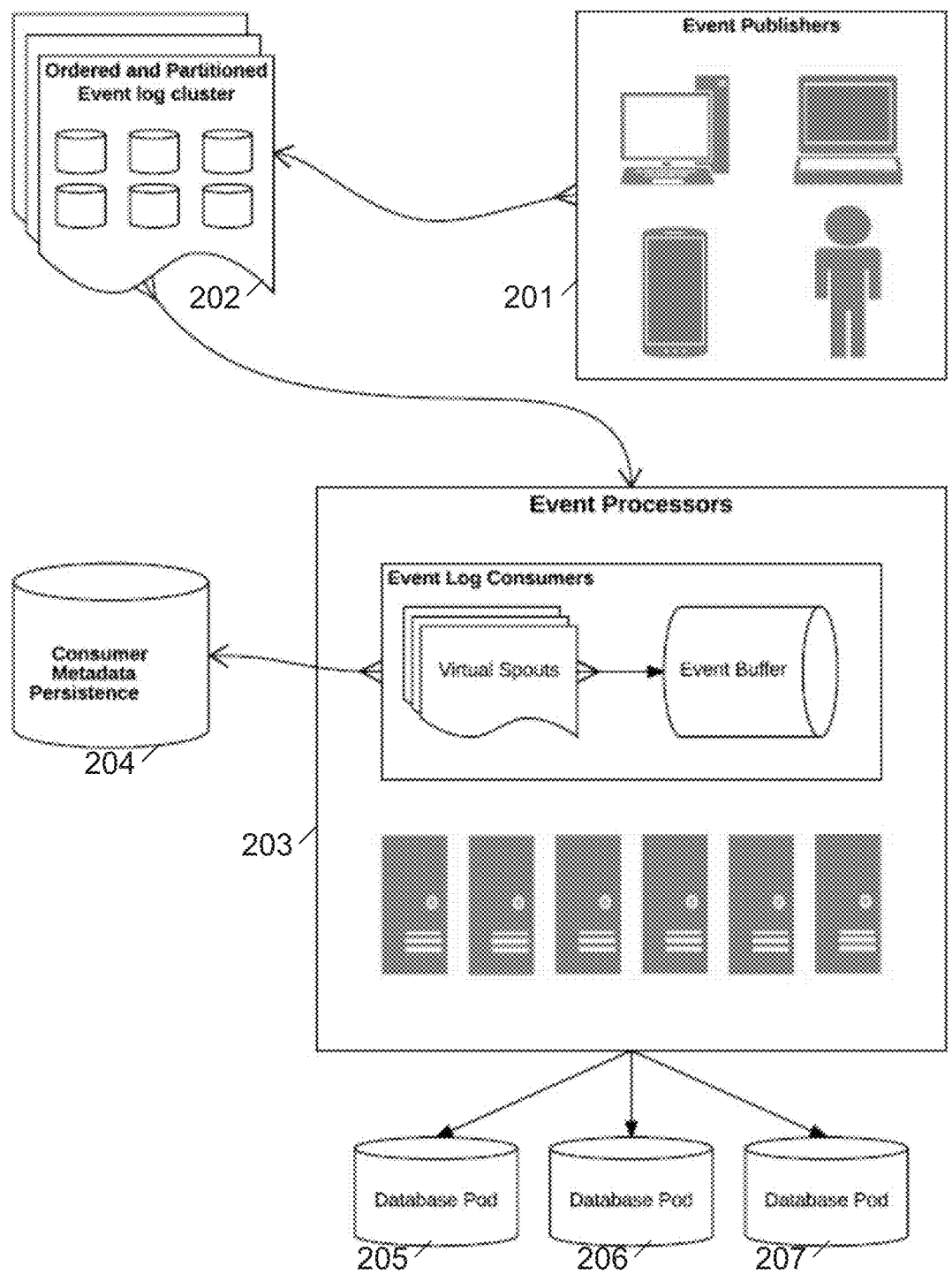
FIG. 2 illustrates a computing system 200 including an event stream processing system.

FIG. 2 illustrates a computing system 200 including an event stream processing system. The computing system 200 may include computing device(s) 201 of one or more event publishers (e.g., a system that generates the events). Computing devices 201 may include any of the components of the database system described in FIGS. 1A-1B. Ordered and partitioned event log cluster 202 may be stored on any data store of the database system described in FIGS. 1A-1B, such as the system database 24 and/or the tenant database 22. Event processors 203 may be components of a data stream processing system (e.g., an event stream processing engine, e.g., Apache Storm). The database pods 205-207 may comprise database pods of any database described herein, such as the tenant database 22, and may be used to store data output by the event processors 203.

The data store 204 may store metadata about the data output to the database pods 205-207 and/or metadata about an input received by the event processors, data about the processing performed by any component of the event processors 203, or the like, or combinations thereof. The metadata may be information about the way that the event processors 203 process the event log cluster 202.

The event processor 203 may include one or more event log consumers. An event log consumer may include one or more virtual spouts to form event data in an event buffer. An event stream processor may access the event buffer.

Figure 3A:
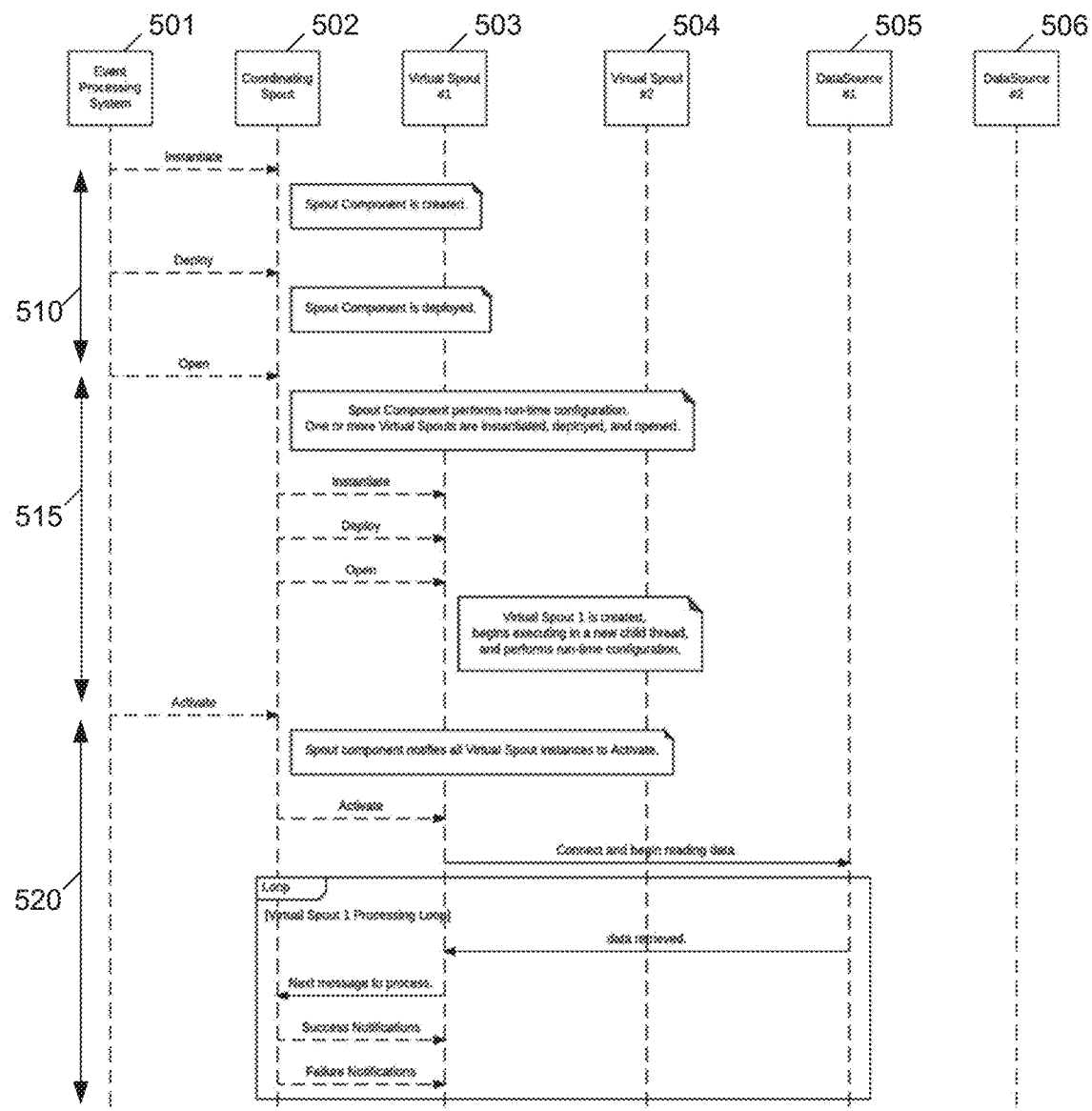
FIGS. 3A-B illustrate a sequence diagram showing a lifecycle of a virtual spout enabled spout instance.
Figure 3B:
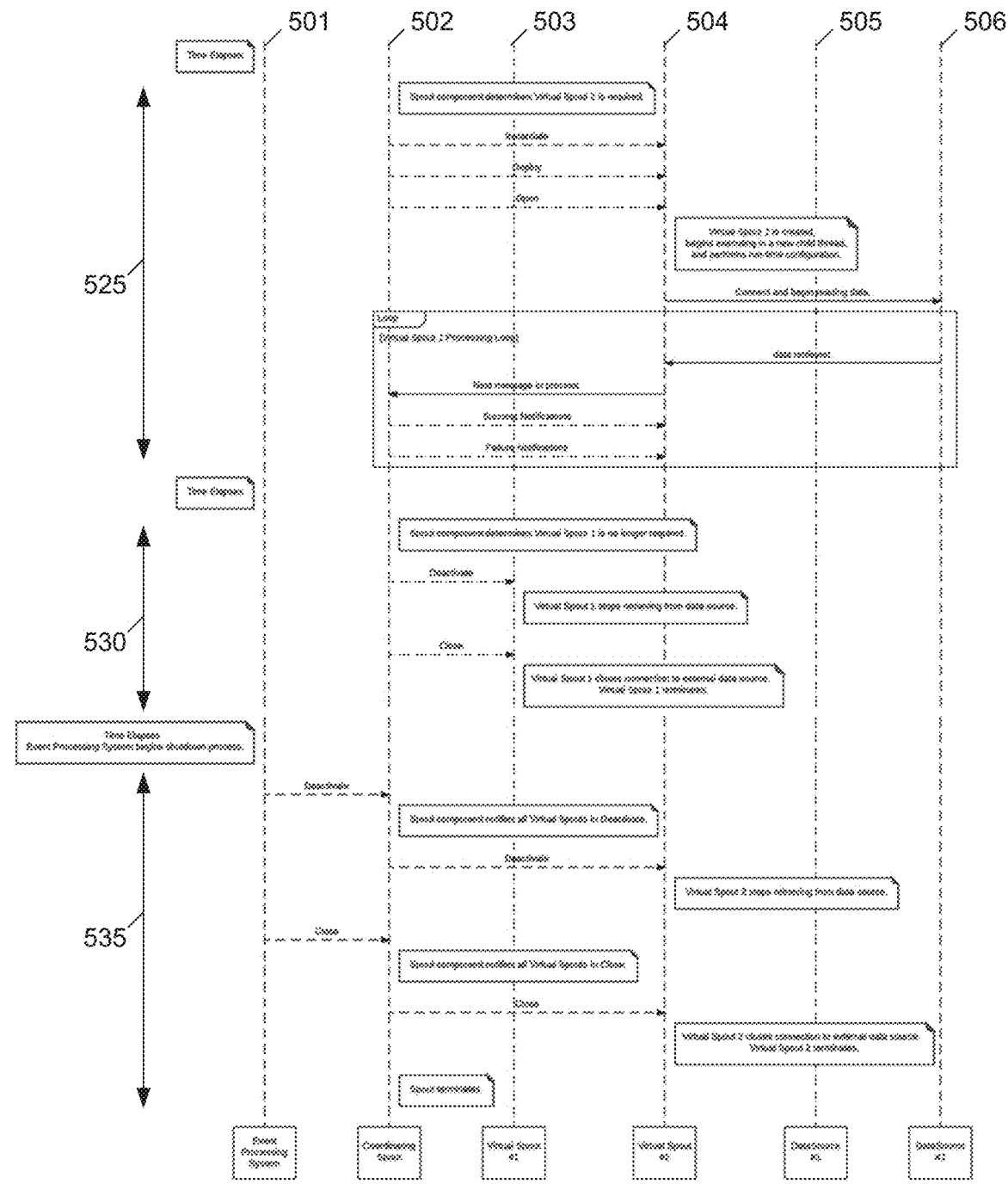

FIGS. 3A-B illustrate a sequence diagram showing a lifecycle of a virtual spout enabled spout instance (e.g., coordinating spout 502). In a time period 510, the coordinating spout 502 may be instantiated, which may be prior to an event stream processor of the event stream processing system 501 generating data. The coordinating spout 502 may be deployed to the event stream processing system 501, and then opened.

In a time period 515, the coordinating spout 502 may perform run-time configuration, and one or more virtual spouts may be instantiated, deployed, and opened. Virtual spout 503 may be created and begin executing a new child thread, and may perform run-time configuration.

In a time period 520, the event stream processor of the event stream processing system 501 may begin pushing data to one or more datastores. The coordinating spout 502 may notify all existing virtual spouts (e.g., the virtual spout 503) to activate. The virtual spout 503 may connect to data source 505 and begin reading data, and may perform the illustrated process loop (the event stream processor may begin pushing data to the one or more datastores responsive to receiving messages from a message buffer of the coordinating spout instance 502.

Referring now to FIG. 3B, in another time period 525, the coordinating spout 502 may identify that an additional virtual spout 504 is needed for a data source 506. This may occur responsive to a request for a new tenant. The coordinating spout 502 may instantiate, deploy, and open the virtual spout 504. Virtual spout 504 may be created and begin executing a new child thread, and may perform run-time configuration. The virtual spout 504 may connect to data source 506 and begin reading data, and may perform the illustrated process loop.

In another time period 530, the coordinating spout 502 may identify that an existing one of the virtual spouts 503 and 504 is no longer required. The coordinating spout 502 may signal the virtual spout 503 to deactivate, for example. The virtual spout 503 may stop retrieving from data source 505. The virtual spout 503 may close its connection to data source 505, and terminate.

In another time period 535, the event stream processing system may shutdown the event stream processing system. In a shutdown, the coordinating spout may signal any remaining spouts to deactivate. The virtual spout 504 may stop retrieving from data source 506. The virtual spout 504 may close its connection to data source 506, and terminate. The coordinating spout 502 may terminate for the event stream processing system shutdown and/or the event stream processor may shutdown.

Lifecycle stages for a coordinating spout may include one or more of the following:

Instantiation—"Virtual Spout enabled" spout components (or "coordinating" spout) is created and configured.

Deployment—Coordinating spouts are deployed

Open—During the open phase a coordinating spout may determine which, if any, virtual spout instances need to be created. For each virtual spout that is to be created, the coordinating spout may create a new virtual spout instance (instantiation phase) within a new child processing thread (deployment phase). The virtual spout instance may be configured (open phase) performing any run-time setup processes.

Activation—During the Activation phase the coordinating spout may notify each virtual spout instance instructing it to activate, or start ingesting data from its configured data source. While a coordinating spout is activated it's managed, each activated virtual spout may follow the Message Lifecycle as described below. At any point during this phase the coordinating spout may dynamically determine that additional virtual spouts are required to ingest data from additional or new data sources. The coordinating spout may follow this same outlined lifecycle for each and every new virtual spout created. At any point during this phase the coordinating spout may dynamically determine that any activated virtual spout is no longer required. It may notify these virtual spouts to continue their lifecycle by Deactivation, and Close.

Deactivation—During the Deactivation phase the coordinating spout may notify all virtual spout instances to deactivate. All virtual spouts may stop ingesting messages from their respective data sources.

Close—During the Close phase the coordinating spout may notify all virtual spout instances to close. All virtual spouts may perform any necessary "cleanup" or "shutdown" tasks. All virtual spouts may then stop executing and terminate their child processing threads. The coordinating spout may wait for all virtual spouts to terminate before terminating itself.

Message Lifecycle

After the coordinating spout creates one or more internal virtual spout instances, they may being submitting messages to a message buffer. The message buffer may be shared between all virtual spouts allowing messages from those virtual spouts to be added to the buffer. When messages are added to the message buffer, the message may be tagged with an identifier that ties the message back to the originating virtual spout.

As the event stream processor (e.g., the stream processing engine) polls the coordinating spout for the next message to be processed, the coordinating spout may retrieve a message from the Message Buffer and returns it to the stream processor for processing.

When the stream processing engine notifies the coordinating spout that a message has completed processing successfully, the coordinating spout may inspect the message and determine which virtual spout the message originated from. The coordinating spout may then route the message complete notification to the appropriate virtual spout to be handled.

When the stream processing engine notifies the coordinating spout that a message has failed to process correctly, the coordinating spout may inspect the message and determine which virtual spout the message originated from. The coordinating spout may then route the message failed notification to the appropriate virtual spout to be handled.

Figure 4:
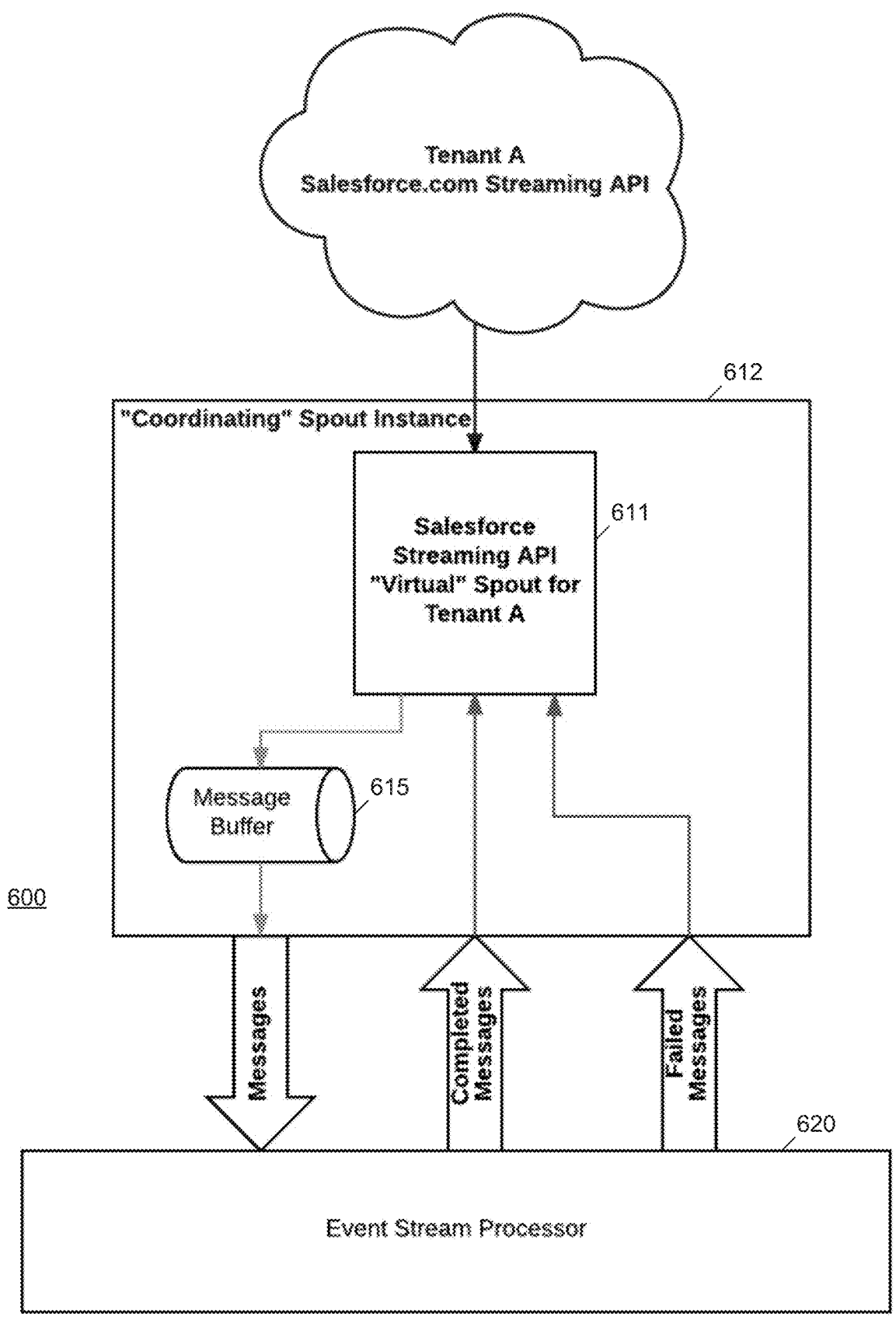
FIG. 4 illustrates an event stream processing system with a single virtual spout.

FIG. 4 illustrates an event stream processing system 600 with a single virtual spout. The event stream processing system 600 may be similar to any event stream processing system described herein, including the event stream processing system of FIG. 2.

Running internally to the single coordinating spout 612 is a single virtual spout instance 611. The virtual spout instance 611 may consume events from tenant A's Salesforce.com streaming API and convert them to messages. These messages may be added to the message buffer 615. The coordinating spout 612 may then move messages off the message buffer 615 and may send them to the event stream processor 620 to be processed. As messages are marked as completed by the event stream processor 620, it may notify the coordinating spout 612. The coordinating spout 612 may direct the notification to the appropriate virtual spout instance 611 for which the message originated. As messages are marked as failed by the event stream processor 620, it may notify the coordinating spout 612. The coordinating spout 612 may direct the notification to the appropriate virtual spout instance 611 for which the message originated.

Figure 5:
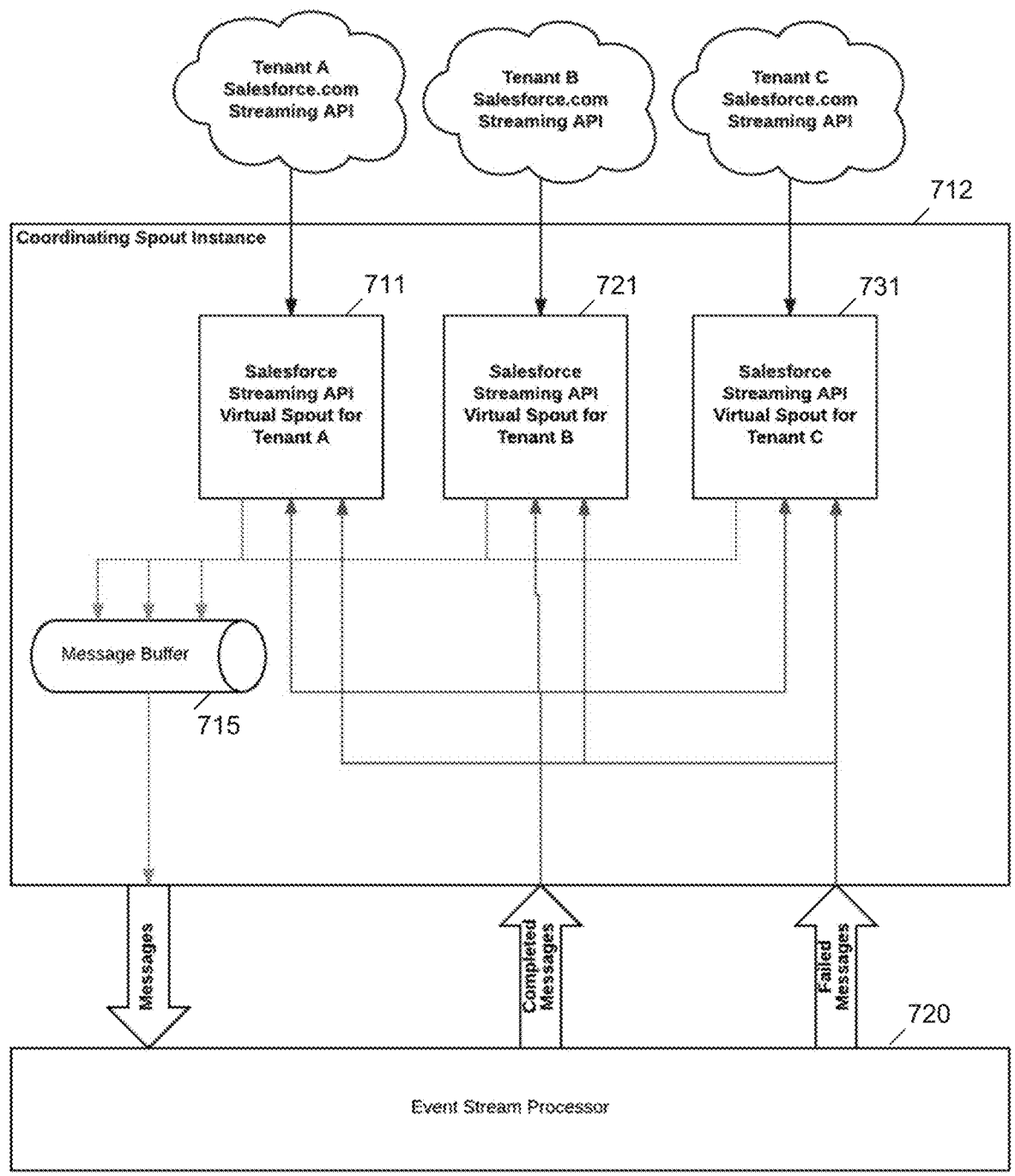
FIG. 5 illustrates an event stream processing system with more than one virtual spout.

FIG. 5 illustrates an event stream processing system 700 with more than one virtual spout. The event stream processing system 700 may be similar to any event stream processing system described herein, including the event stream processing system of FIG. 2.

Running internally to the single coordinating spout 712 are a plurality of virtual spout instances 711, 721, and 731. Each virtual spout instance 711, 721, and 731 may consume data from its respective tenant's data source generating messages. These messages are added to the message buffer 715. The coordinating spout instance 712 then may move messages from the message buffer 715 and may send them to the event stream processor 720 to be processed. As messages are marked as completed by the event stream processor 720, it may notify the coordinating spout 712. The coordinating spout 712 may direct the notification to the appropriate one of the virtual spout instance 711, 721, and 731 for which the message originated. As messages are marked as failed by the event stream processor 720, it may notify the coordinating spout 712. The coordinating spout 712 may direct the notification to the appropriate one of the virtual spout instance 711, 721, and 731 virtual spout instance for which the message originated.

Figure 6:
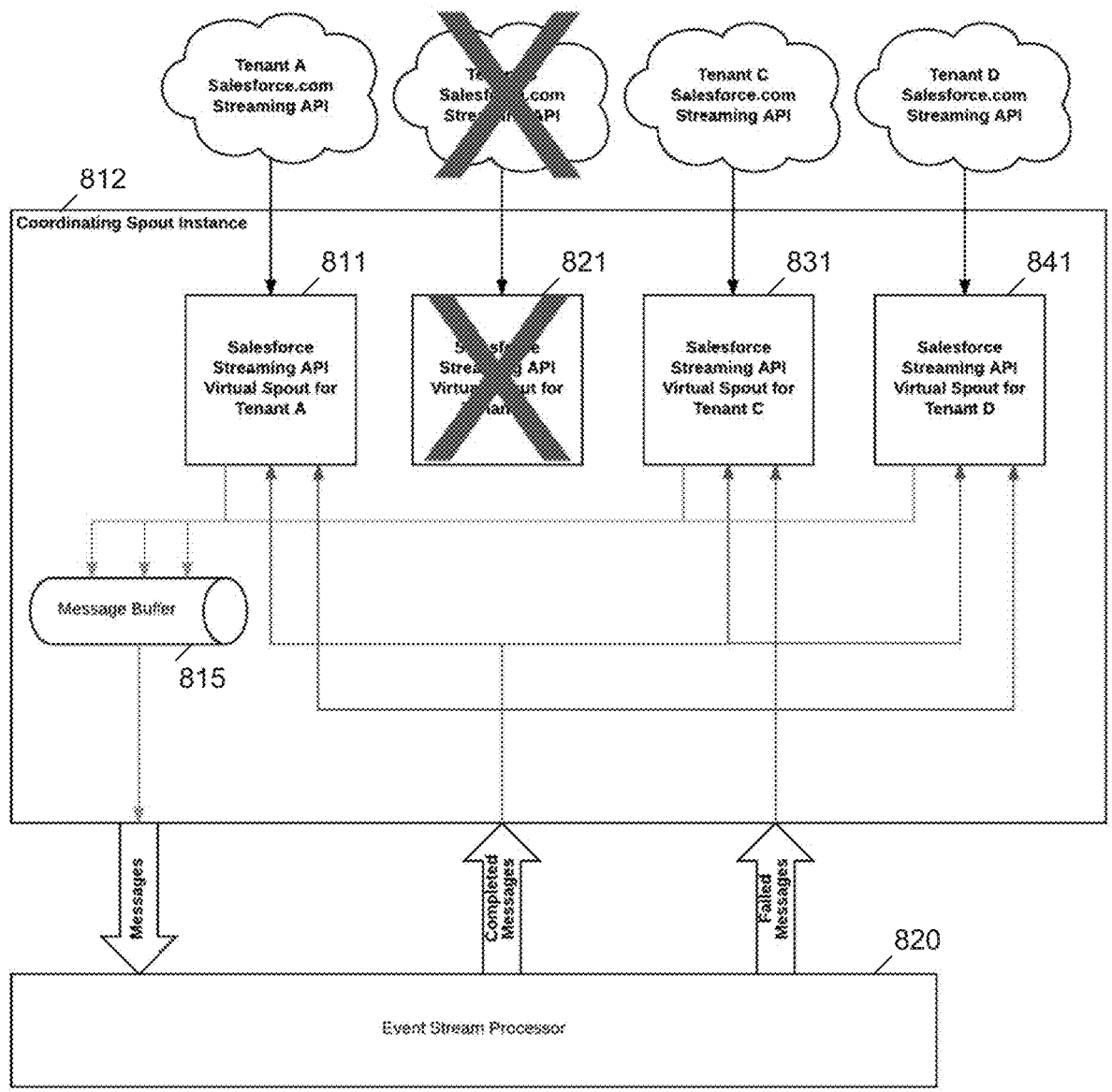
FIG. 6 illustrates the event stream processing system in which a virtual spout for one of the tenants is closed without disrupting service for other tenants.

FIG. 6 illustrates an event stream processing system 800 in which a virtual spout for one of the tenants may be closed without disrupting service for other tenants. The event stream processing system 800 may be similar to any event stream processing system described herein, including the event stream processing system of FIG. 2.

Running internally to the single coordinating spout 812 are a plurality of virtual spout instances 811, 821, 831, and 841. The virtual spout instance 821 for Tenant B was no longer required so it was dynamically shut down, as illustrated by the "X" marking. A new virtual spout instance 841 was created for Tenant D to consume from it's data source as it became required. Each of virtual spout instances 811, 821, 831, and 841 may consume data from its respective tenant's data source, and may generate message therefrom. These messages may be added to the message buffer 815. The coordinating spout instance 812 may then move messages from the message buffer 815 and may send them to the event stream processor 820 to be processed. As messages are marked as completed by the event stream processor 820, it may notify the coordinating spout 812. The coordinating spout 812 may direct the notification to the appropriate one of the virtual spout instances 811, 821, 831, and 841 for which the message originated. As messages are marked as failed by the event steam processor 820, it may notify the coordinating spout 812. The coordinating spout 812 may direct the notification to the appropriate one of the virtual spout instances 811, 821, 831, and 841 for which the message originated.

III. Sidelining in an Event Stream Processing System

An application system (such as Salesforce Pardot) may use a data stream processing system (e.g., Apache Storm) heavily to consume from an ordered time series event log (e.g., Apache Kafka). The event processing system may consume the log and track processed messages using the offsets of the log. The application system may push events from all of its tenants onto a single log. However, there are times such as infrastructure maintenance (customer database needs work) or tenant connectivity (e.g., Salesforce org oauth token expires). During these times, for events associated with this tenant, database calls may be unsuccessfully attempted by the event processing system, which may result in data loss of that tenant's data.

When reading a multi-tenant commit log, it would be desirable to skip processing events for a specific tenant from the log without losing that tenant's data for a period of time while continuing to process the other tenant's events (e.g., postpone processing for a given tenant). A partial solution may be to create additional topics, e.g., one topic per tenant.

However, this partial solution may not scale well a large number of tenants (in some database systems, performance may be impacted when the number of topics exceeds about two hundred).

A data stream processing system may include instructions to perform sidelining. Sidelining may include tracking when a request to postpone processing occurs, by a given filter criteria, and then resuming processing once the circumstances that caused processing to be postponed are changed.

This system may treat those times of maintenance as a set of filtering criteria, and when they are triggered a spout may track the offsets on an ordered time series event log for that given filter criteria. While the filter criteria are applied, any messages flowing from the log that match are never emitted further downstream to the event processor. When the spout is triggered to stop sidelining, the filter may be removed from the main flow of the topic, and new threads or virtual spouts may be spun up to consume the messages between the offsets that match the negation of the original filter criteria of the sideline request. The messages from the sideline are then emitted to the event processor along with the rest of the messages from the main flow.

Some event stream processing systems may include a predefined trigger and filtering semantics used to perform sidelining. The sideline system may be a seamless drop in implementation of data stream ingestion (e.g., a spout, such as a Kafka spout, Storm spout, etc.) handling all the semantics of the selected data flow away from the event stream processor.

Figure 7A:
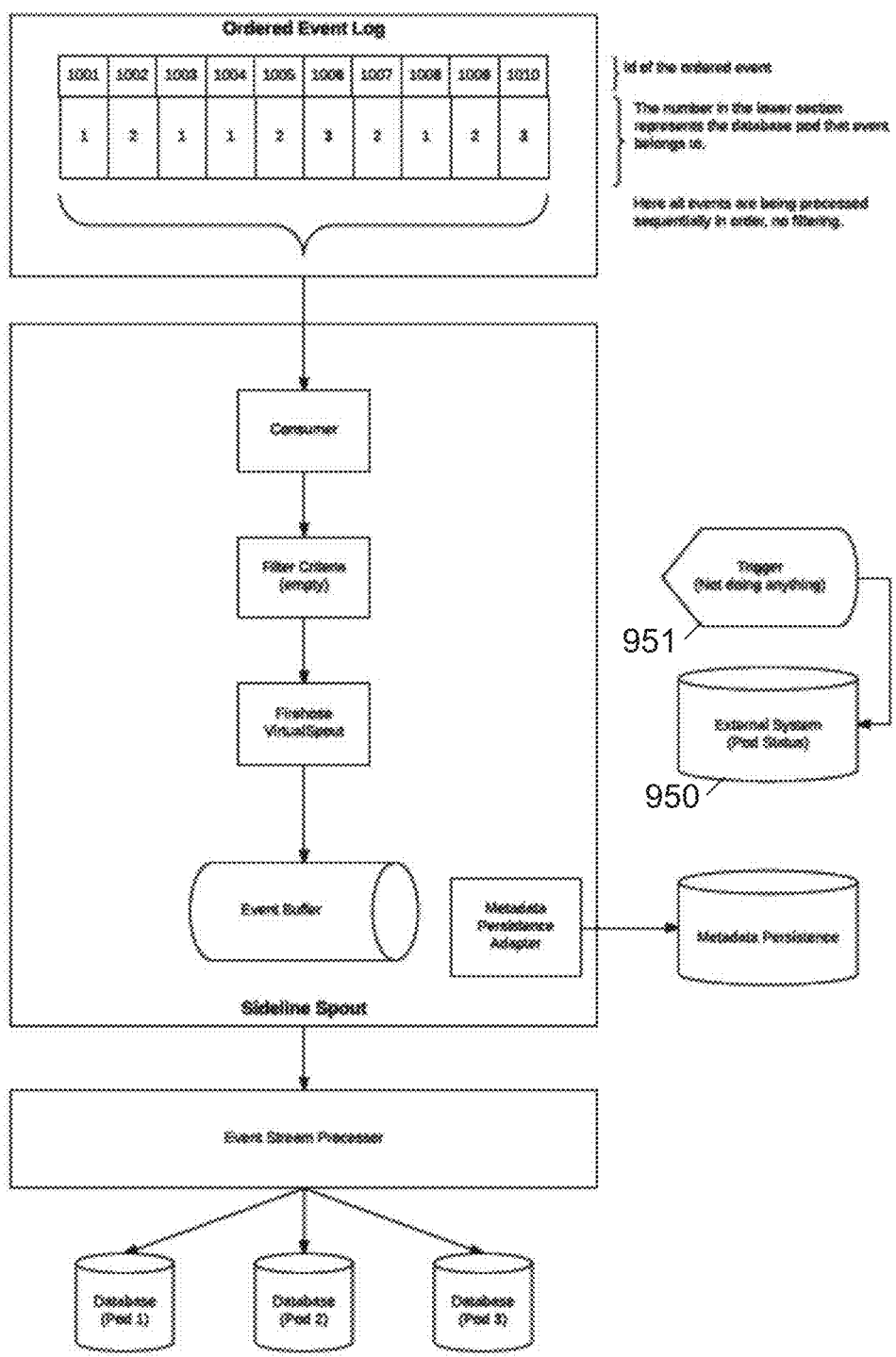
FIGS. 7A-C illustrate, respectively, different states of the event stream processing system of FIG. 2 when not actively sidelining, during sidelining, and after sidelining stops.
Figure 7B:
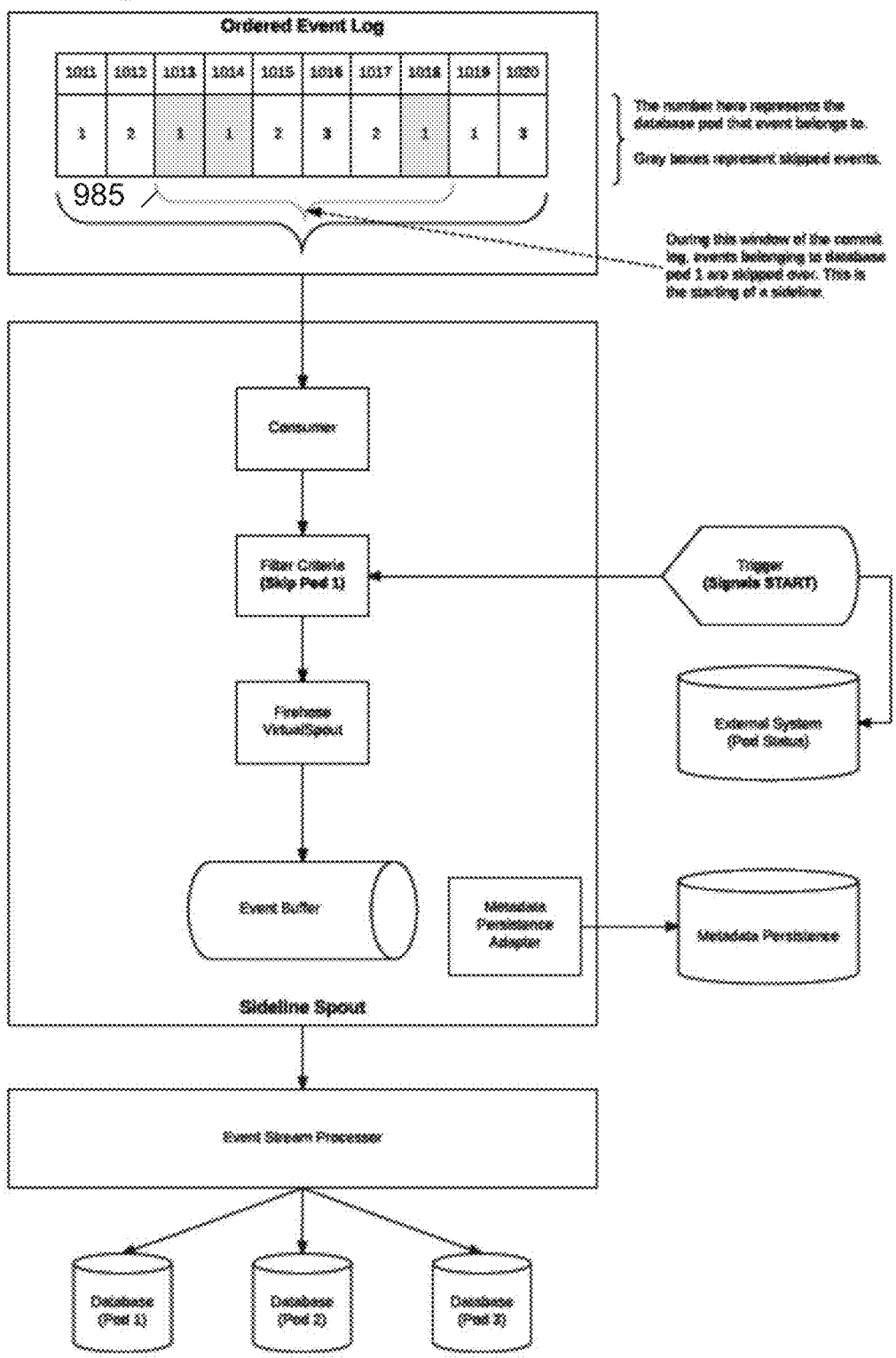
Figure 7C:
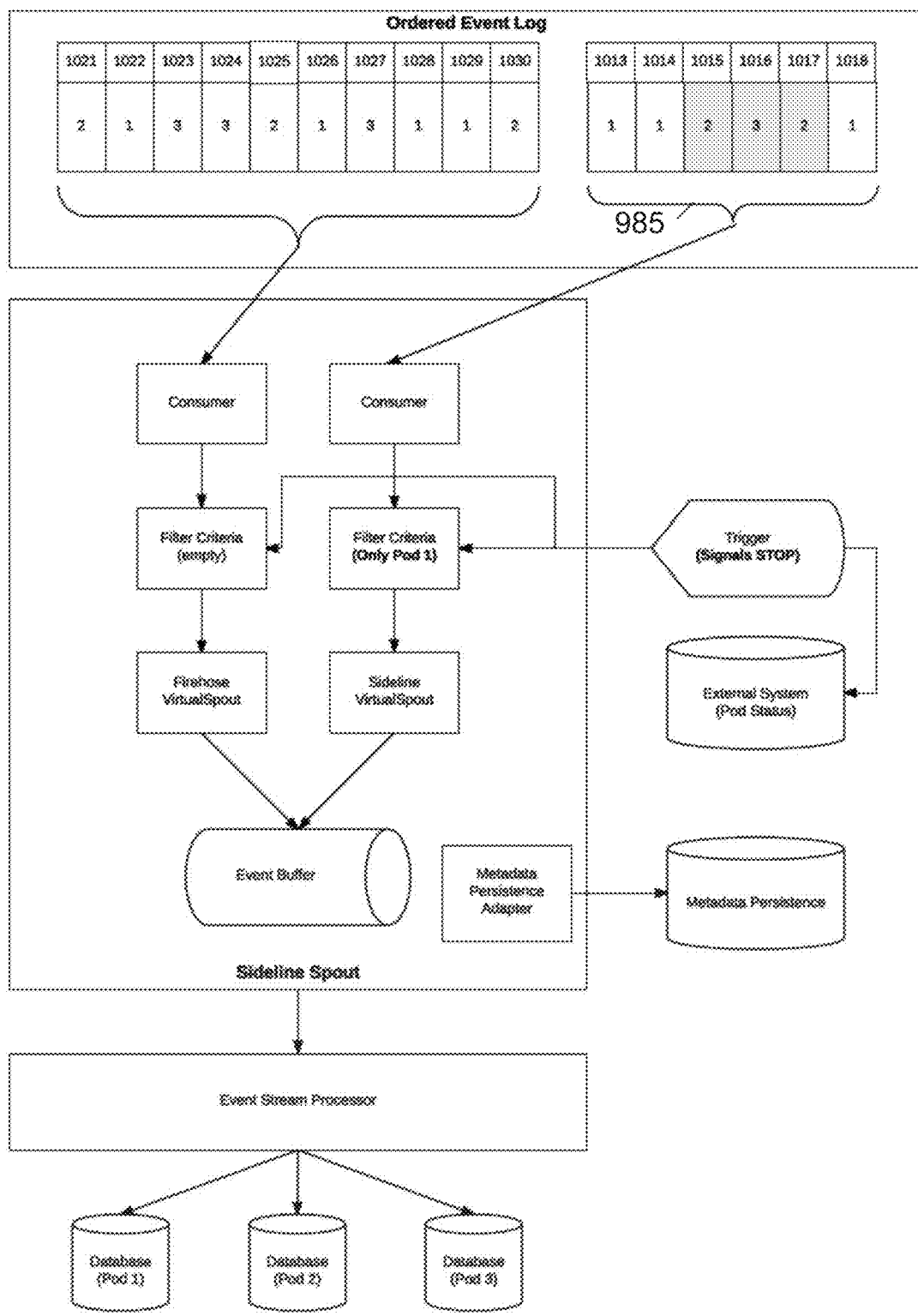

FIGS. 7A-C illustrate, respectively, different states of the event stream processing system when not actively sidelining, during sidelining, and after sidelining stops. The event stream processing system may be similar to any event stream processing system described herein, including the event stream processing system of FIG. 2. In an example, an event stream processing system may include: an event buffer to store event data to be consumed by one or more event stream processors; and a data stream processor to generate a plurality of data streams, wherein each data stream is based on a different subset of a plurality of events, and the streams collectively form the event data stored in the event buffer; wherein an event stream processor of the one or more stream processors is to consume a portion of the event data, said portion corresponding to more than one of the streams.

A trigger 951 may define a condition in which sidelining is to occur. In one example, the trigger 951 may be related to pod status 950. A pod may go offline (e.g., one of the database pods 205-207) for maintenance or other reasons. The trigger 951 in some examples may specify that sidelining is to occur responsive to a pod status changing. In other examples, the trigger 951 may indicate any selected condition in which filtering is to occur.

It should be appreciated that the trigger 951 may in other examples relate to any condition in which filtering is to begin, which could be unrelated to availability of database system components such as the database pods 1-3. Filtration could be based on a customer request, for instance and/or a query associated with the ordered event log.

A spout may be a first piece of a chain of processing mechanisms (A passes on to B, B passes onto C, etc.) The spout may be responsible for getting the data source in a form that the event stream processors can handle. The spout may be a data source processor. Within the spout, a first stage may be responsible for reading from the data source (e.g., consuming raw data of the data source). The virtual spout in the "not actively sidelining" state may be a first virtual spout (e.g., the firehouse virtual spout).

Referring now to FIG. 7B, during a window 985 the filter criteria is to be applied. The filtering criteria controls which data is passed on to the first virtual spout. The first virtual spout skips the greyed out events of window 985. The filtering criteria may be a selected account. In the example for a pod to go down (say for maintenance or some other reason), the selected accounts may be accounts associated with that pod (in the illustration accounts associated with pod 1 is the filtering criteria).

Referring now to FIG. 7C, when the sidelining stops, a second virtual spout may be spun up. The second virtual spout may have a consumer that also receives the events of the window 985. A negation of the filtering criteria (e.g., in this case only pod 1) is applied to data feeding into the second virtual spout. In this state, both virtual spouts may feed data into the same event buffer. Therefore, in the illustrated example the second virtual spout provides the events associated with pod 1 during the window 985 to the event number.

In the pod outage example, the event stream processor continues working during the outage; however, it does not receive events associated with the pod subject to the outage, and as such, does not make database calls to the downed pod during the window (if database calls were made during the window, data loss could occur). The "skipped" events may be provided by the second virtual spout later (after the window), and the event stream processor may make its database calls in a time period that the first pod is back up (data loss may be avoided).

The event stream processor may operate on the data of the event buffer as if there was a single spout. There can be any number of virtual spouts, however. An interface may be provided to establish any number of additional spouts based on additionally specified filter criteria. The additional virtual spouts may be spun up when their respective windows for their respective filtering criteria. The event stream processor may not require any knowledge that there is more than one spout; therefore, a legacy event stream processor may be used with the virtual spouts of FIGS. 7A-7B.

Figure 8A:
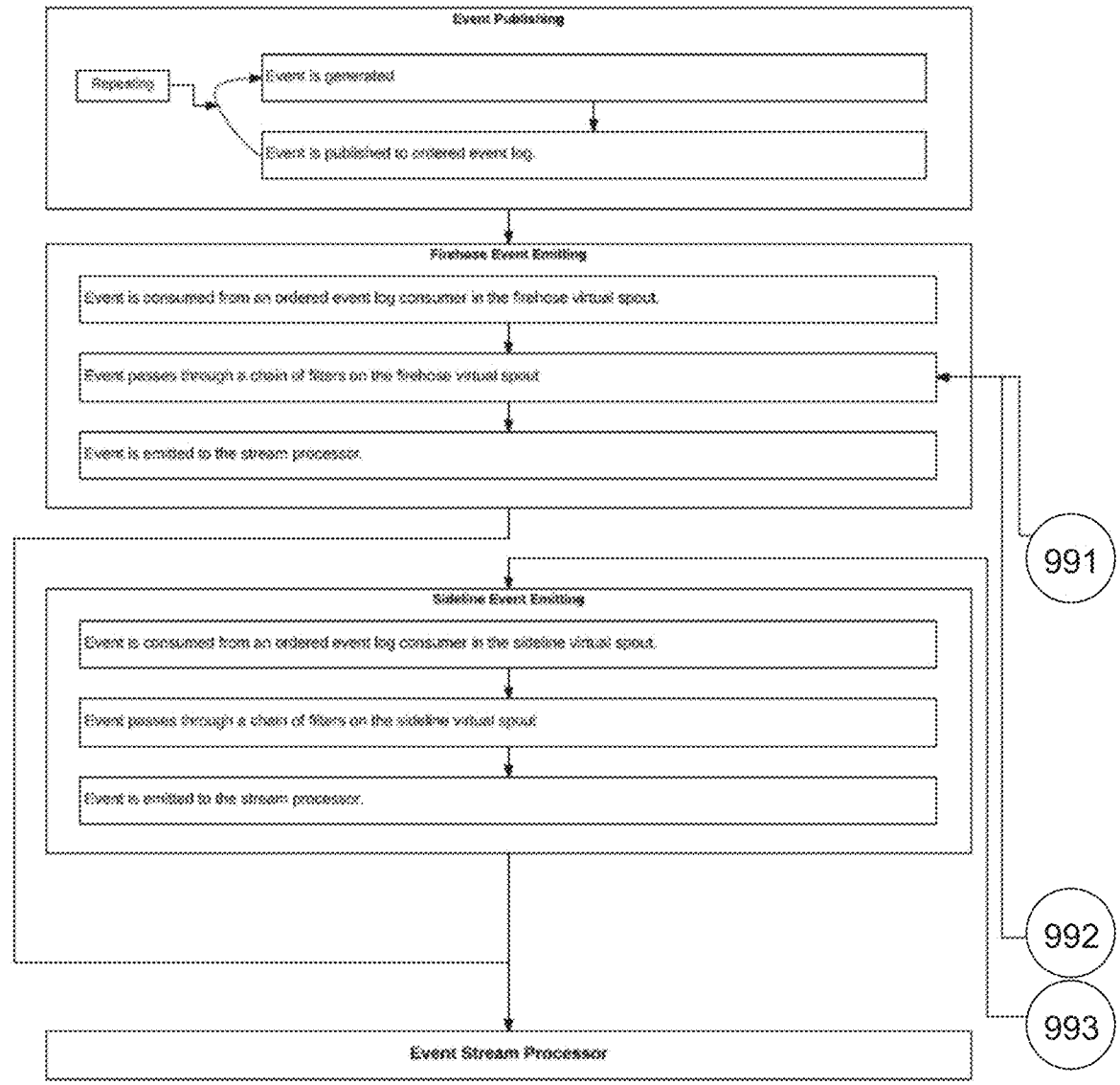
FIGS. 8A-B illustrate processes that may be performed by the event stream processing system described in FIGS. 2 and/or 7A-C.
Figure 8B:
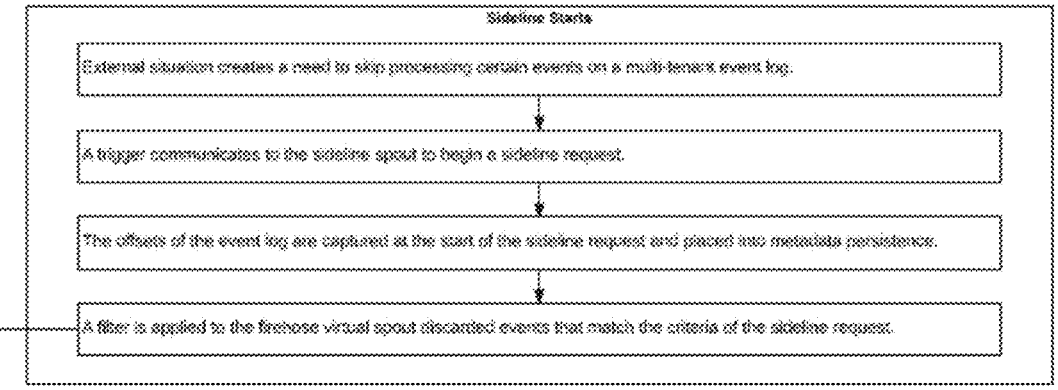
Figure 8B:
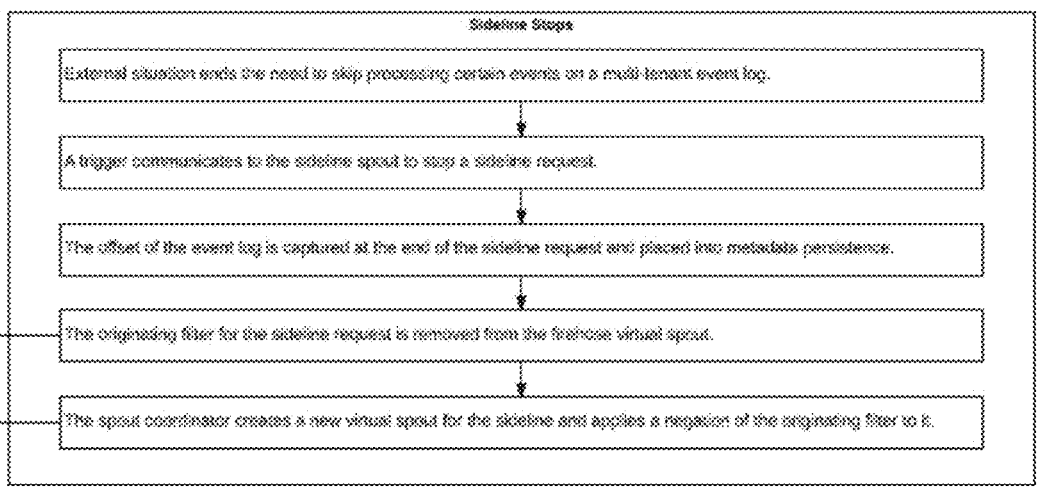

FIGS. 8A-B illustrate processes that may be performed by any event stream processing system described herein, including the event stream processing systems of FIGS. 2 and/or 7A-C. The circles 991, 992, and 993 demark where FIG. 8A continues to FIG. 8B for the illustrated processes.

EXAMPLES

Example 1 is a stream processing system to ingest data from one or more data sources and convert the data into an unbounded stream for an event stream processor, the stream processing system comprising: a first coordinating spout instance that is deployed at a first time, the first coordinating spout instance to instantiate one or more second spout instances and deploy said one more second spout instances at a second time that is later than the first time; the one or more second spout instances to: connect to the one or more data sources, respectively, and ingest a respective portion of the data from its respective one of the one or more data sources; and output messages based on the ingested portions of the data; herein the unbounded stream for the event stream processor is based on the messages.

Example 2 may include the subject matter of example 1 or any other example herein, further comprising a message buffer to receive the output messages, wherein the unbounded stream is output from the buffer.

Example 3 may include the subject matter of any of examples 1-2 or any other example herein, further comprising: the first coordinating spout instances to instantiate one or more third spout instances and deploy said one more third spout instances at a third time that is later than the second time; the one or more third spout instances to: connect to one or more additional data sources, respectively, and ingest a respective portion of additional data from its respective one of the one or more additional data sources; and output messages based on the ingested portions of the additional data; wherein the unbounded stream for the event stream processor is based on the messages and the additional messages.

Example 4 may include the subject matter of any of examples 1-3 or any other example herein, wherein the data sources comprise time ordered series event logs.

Example 5 may include the subject matter of any of examples 1-4 or any other example herein, wherein the data sources comprise time ordered series event logs, and wherein the additional data sources comprise additional time ordered series event logs.

Example 6 may include the subject matter of any of examples 1-5 or any other example herein, wherein the additional time ordered series event logs begin after a start time of the time ordered series event logs.

Example 7 may include the subject matter of any of examples 1-6 or any other example herein, wherein the first coordinating spout instance is further to receive messages from the event stream processor, to distribute the messages amongst the one or more second spout instances and the one or more third spout instances based on content of the messages.

Example 8 may include the subject matter of any of examples 1-7 or any other example herein, wherein the messages comprise message completion notifications and message failure notifications generated by the event stream processor responsive to processing the unbounded stream.

Example 9 may include the subject matter of any of examples 1-8 or any other example herein, wherein the messages are received over a single output interface of the event stream processor.

Example 10 may include the subject matter of any of examples 1-9 or any other example herein, the first coordinating spout instance to select an individual one of the one more second spout instances, to notify the individual one of the one or more second spout instances to deactivate, to close the selected spout instance the individual one of the one or more second spout instances.

Example 11 is a method of ingesting data from one or more data sources and convert the data into an unbounded stream for an event stream processor, the method comprising: deploying a first coordinating spout instance at a first time; after deploying the first coordinating spout instance, using the first coordinating spout instance to instantiate one or more second spout instances and deploy said one more second spout instances at a second time that is later than the first time; connecting to the one or more data sources, using the one or more second spout instances respectively, to ingest respective portions of the data from the one or more data sources; and outputting messages from the one or more second spout instances based on the ingested portions of the data, wherein the unbounded stream for the event stream processor is based on the messages.

Example 12 may include the subject matter of example 11 or any other example herein, further comprising outputting the messages to a single buffer, wherein the unbounded stream is output from the buffer.

Example 13 may include the subject matter of any of examples 11-12 or any other example herein, further comprising: instantiating, after deployment of the first coordinating spout instance, one or more third spout instances and deploy said one more third spout instances at a third time that is later than the second time; connecting to one or more additional data sources, using the one or more third spout instances respectively, to ingest respective portions of additional data from the one or more additional data sources; and outputting messages from the one or more third spout instances based on the ingested portions of the additional data; wherein the unbounded stream for the event stream processor is based on the messages and the additional messages.

Example 14 may include the subject matter of any of examples 11-13 or any other example herein, wherein the data sources comprise time ordered series event logs.

Example 15 may include the subject matter of any of examples 11-14 or any other example herein, wherein the data sources comprise time ordered series event logs, and wherein the additional data sources comprise additional time ordered series event logs.

Example 16 may include the subject matter of any of examples 11-15 or any other example herein, wherein the additional time ordered series event logs begin after a start time of the time ordered series event logs.

Example 17 may include the subject matter of any of examples 11-16 or any other example herein, further comprising: receiving messages from the event stream processor at the first coordinating spout instance; and distributing the messages amongst the one or more second spout instances and the one or more third spout instances based on content of the messages.

Example 18 may include the subject matter of any of examples 11-17 or any other example herein, wherein the messages comprise message completion notifications and message failure notifications generated by the event stream processor responsive to processing the unbounded stream.

Example 19 may include the subject matter of any of examples 11-18 or any other example herein, wherein the messages are received over a single output interface of the event stream processor.

Example 20 may include the subject matter of any of examples 11-19, or any other example herein, further comprising: selecting an individual one of the one more second spout instances to be closed while the coordinating spout instance remains open; notifying the individual one of the one or more second spout instances to deactivate; and closing the selected spout instance the individual one of the one or more second spout instances while maintaining an interface with the event stream processor by the first coordinating spout instance.

Example 21 is an event stream processing system, comprising: an event buffer to store event data to be consumed by one or more event stream processors; and a data stream processor to generate a plurality of data streams, wherein each data stream is based on a different subset of a plurality of events, and the streams collectively form the event data stored in the event buffer; wherein an event stream processor of the one or more stream processors is to consume a portion of the event data, said portion corresponding to more than one of the streams.

Example 22 includes the subject matter of example 21 or any other example herein, wherein: the data stream processor is to apply one or more filtering criteria to a portion of an ordered event log during a selected time period to identify a corresponding one of the subsets of the plurality of events for forming a first stream of the plurality of streams; and the data stream processor is to apply a negation of the one or more filtering criteria to the same portion of the ordered event log after an end of the selected time period to identify a different corresponding one of the subsets of the plurality of events for forming a second different stream of the plurality of streams.

Example 23 includes the subject matter of any of examples 21-22 or any other example herein, wherein the time period corresponds to a period of unavailability of a pod of a plurality of pods that are to store data generated by the one or more event stream processors.

Example 24 includes the subject matter of any of examples 21-23 or any other example herein, wherein filtering of information of the portion of ordered event log using the one or more filtering criteria cause a subset of the information of the ordered event log to be skipped during formation of the first stream.

Example 25 includes the subject matter of any of examples 21-24 or any other example herein, wherein filtering of the information of the portion of the ordered event log using the negation of the one or more filtering criteria cause the second data stream processor to skip, during formation of the second different stream, all information of the portion of the ordered event log except for said subset of the information.

Example 26 includes the subject matter of any of examples 21-25 or any other example herein, wherein the data stream processor comprises a spout and each stream originates from a different virtual spout of a plurality of virtual spouts of the spout.

Example 27 is a method for using an event stream processing system, the method comprising: storing, in an event buffer, event data to be consumed by one or more event stream processors; and generating a plurality of data streams, wherein each data stream is based on a different subset of a plurality of events, and the streams collectively form the event data stored in the event buffer; wherein an event stream processor of the one or more stream processors is to consume a portion of the event data, said portion corresponding to more than one of the streams.

Example 28 includes the subject matter of example 27 or any example herein, further comprising: applying one or more filtering criteria to a portion of an ordered event log during a selected time period to identify a corresponding one of the subsets of the plurality of events for forming a first stream of the plurality of streams; and applying a negation of the one or more filtering criteria to the same portion of the ordered event log after an end of the selected time period to identify a different corresponding one of the subsets of the plurality of events for forming a second different stream of the plurality of streams.

Example 29 includes the subject matter of any of examples 27-28 or any other example herein, wherein the time period corresponds to a period of unavailability of a pod of a plurality of pods that are to store data generated by the one or more event stream processors.

Example 30 includes the subject matter of any other example herein, wherein filtering of information of the portion of ordered event log using the one or more filtering criteria cause a subset of the information of the ordered event log to be skipped during formation of the first stream.

Example 31 includes the subject matter of any of examples 27-30 or any other example herein, wherein filtering of the information of the portion of the ordered event log using the negation of the one or more filtering criteria causes all information of the portion of the ordered event log except for said subset of the information to be skipped during formation of the second different stream.

Example 32 includes the subject matter of any of examples 27-31 or any other example herein, wherein each stream originates from a different virtual spout of a plurality of virtual spouts of a spout from which the event stream processor consumes.

Example 33 includes the subject matter of any of examples 1-10 or any other example herein, wherein the one or more second spout instances comprises a plurality of spout instances, wherein: a first spout instance of the plurality of spout instances is configured to apply, for a selected time period, one or more filtering criteria to the ingested portion of the data; wherein a first subset of the messages is generated by the first spout instance of the plurality of spout instances responsive to an application of the one or more filtering criteria; and a second spout instance of the plurality of spout instances is configured to apply, after an end of the selected time period, a negation of the one or more filtering criteria to the same ingested portion of the data; wherein a second different subset of the messages is generated by the second spout instance of the plurality of spout instances responsive to an application of the negation of the one or more filtering criteria.

Example 34 includes the subject matter of any of examples 1-10 or 33 or any other example herein, wherein the selected time period corresponds to a period of unavailability of a storage device to store data generated by the event stream processor.

Example 35 is a stream processing system to ingest data from one or more data sources and convert the data into an unbounded stream for an event stream processor, the stream processing system comprising: a first coordinating spout instance that is deployed at a first time, the first coordinating spout instance to instantiate a second spout instance and a third spout instance; the first coordinating spout instance to sequentially deploy the second and third spout instances, the second spout instance deployed at a second time that is later than the first time and the third spout instance deployed at a third time that is later than the second time; the second and third spout instances to each ingest a same portion of the data from the one or more data sources and output first messages and second messages, respectively; wherein the unbounded stream for the event stream processor is based on the first and second messages.

Example 36 includes the subject matter of example 35 or any other example herein, wherein the second spout instance is configured to apply a first filtering criterion to the portion of the data from the one or more data sources, and wherein the third spout instance is configured to apply a second filtering criterion that is different than the first filtering criterion to the portion of the data from the one or more data sources.

Example 37 includes the subject matter of any of examples 35-36 or any other example herein, wherein the second filtering criterion comprises a negation of the first filtering criterion.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a database system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

The invention claimed is:

1. A stream processing system to ingest data from one or more data sources and convert the data into an unbounded stream for an event stream processor, the stream processing system comprising:
   a first coordinating spout instance that is deployed and performs run-time configuration in a first time period, the first coordinating spout instance to instantiate one or more second spout instances and deploy said one more second spout instances in a second time period following the first time period;
   the one or more second spout instances to:
      connect to the one or more data sources, respectively, and ingest a respective portion of the data from its respective one of the one or more data sources; and
      output messages based on the ingested portions of the data;
   wherein the unbounded stream for the event stream processor is based on the messages.

2. The stream processing system of claim 1, further comprising:
   the first coordinating spout instances to instantiate one or more third spout instances and deploy said one more third spout instances in a third time period following the second time period, wherein the one or more second spout instances perform run-time configuration in the second time period;
   the one or more third spout instances to:
      connect to one or more additional data sources, respectively, and ingest a respective portion of additional data from its respective one of the one or more additional data sources; and
      output additional messages based on the ingested portions of the additional data; and
   wherein the unbounded stream for the event stream processor is based on the messages and the additional messages.

3. The stream processing system of claim 2, wherein the first coordinating spout instance is further to receive messages from the event stream processor, to distribute the messages received from the event stream processor amongst the one or more second spout instances and the one or more third spout instances based on content of the messages received from the event stream processor.

4. The stream processing system of claim 3, wherein the messages received from the event stream processor comprise message completion notifications and message failure notifications generated by the event stream processor responsive to processing the unbounded stream.

5. The stream processing system of claim 4, wherein the messages received from the event stream processor are received over a single output interface of the event stream processor.

6. The stream processing system of claim 2, wherein the one or more data sources comprise time ordered series event logs, and wherein the one or more additional data sources comprise additional time ordered series event logs.

7. The stream processing system of claim 6, wherein the additional time ordered series event logs begin after a start time of the time ordered series event logs.

8. The stream processing system of claim 1, wherein the one or more second spout instances comprise a plurality of spout instances, wherein:
   a first spout instance of the plurality of spout instances is configured to apply, for a selected time period, one or more filtering criteria to the ingested portion of the data;
   wherein a first subset of the messages is generated by the first spout instance of the plurality of spout instances responsive to an application of the one or more filtering criteria; and
   a second spout instance of the plurality of spout instances is configured to apply, after an end of the selected time period, a negation of the one or more filtering criteria to the same ingested portion of the data;
   wherein a second different subset of the messages is generated by the second spout instance of the plurality of spout instances responsive to an application of the negation of the one or more filtering criteria.

9. The stream processing system of claim 8, wherein the selected time period corresponds to a period of unavailability of a storage device to store data generated by the event stream processor.

10. The stream processing system of claim 1, further comprising a message buffer to receive the messages, wherein the unbounded stream is output from them message buffer.

11. The stream processing system of claim 1, wherein the one or more data sources comprise time ordered series event logs.

12. The stream processing system of claim 1, the first coordinating spout instance to select an individual one of the one more second spout instances, to notify the individual one of the one or more second spout instances to deactivate, to close the individual one of the one or more second spout instances.

13. A method of ingesting data from one or more data sources and convert the data into an unbounded stream for an event stream processor, the method comprising:
    deploying a first coordinating spout instance in a first time period, wherein the first coordinating spout instance performs run-time configuration in the first time period;
    in a second time period that follows the first time period, using the first coordinating spout instance to instantiate one or more second spout instances and deploy said one more second spout instances, wherein the one or more second spout instances perform run-time configuration in the second time period;
    connecting to the one or more data sources, using the one or more second spout instances respectively, to ingest respective portions of the data from the one or more data sources; and
    outputting messages from the one or more second spout instances based on the ingested portions of the data;
    wherein the unbounded stream for the event stream processor is based on the messages.

14. The method of claim 13, further comprising:
    in a third time period following the second time period, instantiating one or more third spout instances and deploying said one more third spout instances, wherein the one or more third spout instances perform run-time configuration in the third time period;
    connecting to one or more additional data sources, using the one or more third spout instances respectively, to ingest respective portions of additional data from the one or more additional data sources;
    outputting additional messages from the one or more third spout instances based on the ingested portions of the additional data; and
    wherein the unbounded stream for the event stream processor is based on the messages and the additional messages.

15. The method of claim 14, further comprising:
    receiving messages from the event stream processor at the first coordinating spout instance; and
    distributing the messages received from the event stream processor amongst the one or more second spout instances and the one or more third spout instances based on content of the received from the event stream processor messages.

16. The method of claim 15, wherein the messages received from the event stream processor comprise message completion notifications and message failure notifications generated by the event stream processor responsive to processing the unbounded stream.

17. The method of claim 16, wherein the messages received from the event stream processor are received over a single output interface of the event stream processor.

18. The method of claim 14, wherein the one or more data sources comprise time ordered series event logs, and wherein the one or more additional data sources comprise additional time ordered series event logs.

19. The method of claim 18, wherein the additional time ordered series event logs begin after a start time of the time ordered series event logs.

20. The method of claim 13, further comprising outputting the messages to a single message buffer, wherein the unbounded stream is output from the single message buffer.

21. The method of claim 13, wherein the one or more data sources comprise time ordered series event logs.

22. The method of claim 13, further comprising:
    selecting an individual one of the one more second spout instances to be closed while the coordinating spout instance remains open;
    notifying the individual one of the one or more second spout instances to deactivate; and
    closing the individual one of the one or more second spout instances while maintaining an interface with the event stream processor by the first coordinating spout instance.

23. A stream processing system to ingest data from one or more data sources and convert the data into an unbounded stream for an event stream processor, the stream processing system comprising:
    a first coordinating spout instance that is deployed at a first time, the first coordinating spout instance to instantiate a second spout instance and a third spout instance;
    the first coordinating spout instance to sequentially deploy the second and third spout instances, the second spout instance deployed at a second time that is later than the first time and the third spout instance deployed at a third time that is later than the second time;
    the second and third spout instances to each ingest a same portion of the data from the one or more data sources and output first messages and second messages, respectively;
    wherein the unbounded stream for the event stream processor is based on the first and second messages.

24. The stream processing system of claim 23, wherein the second spout instance is configured to apply a first filtering criterion to the portion of the data from the one or more data sources, and wherein the third spout instance is configured to apply a second filtering criterion that is different than the first filtering criterion to the portion of the data from the one or more data sources.

25. The stream processing system of claim 24, wherein the second filtering criterion comprises a negation of the first filtering criterion.

* * * * *